(12) United States Patent
Larson et al.

(10) Patent No.: US 10,114,837 B2
(45) Date of Patent: Oct. 30, 2018

(54) DISTRIBUTED TRANSACTION MANAGEMENT

(71) Applicant: Microsoft Technology Licensing, LLC, Redmond, WA (US)

(72) Inventors: Per-Ake Larson, Redmond, WA (US); Michael James Zwilling, Redmond, WA (US); Cristian Diaconu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

(21) Appl. No.: 14/712,755

(22) Filed: May 14, 2015

(65) Prior Publication Data
US 2015/0254273 A1    Sep. 10, 2015

Related U.S. Application Data

(63) Continuation of application No. 13/691,018, filed on Nov. 30, 2012, now Pat. No. 9,075,841, which is a (Continued)

(51) Int. Cl.
*G06F 17/30* (2006.01)

(52) U.S. Cl.
CPC .. *G06F 17/30227* (2013.01); *G06F 17/30353* (2013.01); *G06F 17/30371* (2013.01); (Continued)

(58) Field of Classification Search
CPC ......... G06F 17/30277; G06F 17/30575; G06F 17/30371; G06F 17/30353; G06F 17/30581; G06F 17/30864
See application file for complete search history.

(56) References Cited

U.S. PATENT DOCUMENTS 5,212,788 A * 5/1993 Lomet ............... G06F 17/30309
5,485,607 A    1/1996 Lomet et al.
(Continued)

OTHER PUBLICATIONS

Reed, D., "Naming and Synchronization in a Decentralized Computer System", Ph.D. Thesis, Department of Electrical Engineering and Computer Science, Massachusetts Institute of Technology, 1978, 187 pages.

(Continued)

*Primary Examiner* — Etienne Leroux
(74) *Attorney, Agent, or Firm* — Cooper Legal Group, LLC

(57) ABSTRACT

The subject disclosure relates to a distributed transaction management technique that ensures synchronization between participating nodes in a global or distributed transaction. The technique leverages a commit protocol that uses local clocks at the respective participating nodes. Participants in a global transaction are configured to utilize the same commit timestamp and logical read time and can advance their respective local clocks to establish this synchronization. In one embodiment, distributed commit utilizes a modified version of two-phase commit that includes an extra phase to collect commit timestamp votes from participants. Additionally, a heartbeat mechanism can be used to establish loose synchronization between nodes. In another embodiment, a node can respond to a remote transaction request by returning a list of nodes involved in generating the result of the transaction and the types of access used by such nodes in addition to the transaction result itself.

23 Claims, 9 Drawing Sheets

Example Processing of a Global Transaction G-TA

Related U.S. Application Data continuation of application No. 12/908,749, filed on Oct. 20, 2010, now Pat. No. 8,356,007.

(52) U.S. Cl.
CPC .. *G06F 17/30575* (2013.01); *G06F 17/30581* (2013.01); *G06F 17/30864* (2013.01)

(56) References Cited

U.S. PATENT DOCUMENTS

| | | | |
|---|---|---|---|
| 5,504,899 A | 4/1996 | Raz | |
| 5,551,023 A | 8/1996 | Alonso | |
| 5,701,480 A | 12/1997 | Raz | |
| 5,870,758 A | 2/1999 | Bamford et al. | |
| 7,233,947 B2 | 6/2007 | Lomet | |
| 7,243,088 B2 | 7/2007 | Verma et al. | |
| 7,424,499 B2 | 9/2008 | Lomet | |
| 7,478,400 B1* | 1/2009 | Banerjee | G06F 17/30067 709/201 |
| 7,743,083 B2 | 6/2010 | Bhogi et al. | |
| 8,032,496 B2 | 10/2011 | Sinha et al. | |
| 8,356,007 B2 | 1/2013 | Larson et al. | |
| 8,396,831 B2 | 3/2013 | Larson et al. | |
| 9,075,841 B2* | 7/2015 | Larson | G06F 17/30575 |
| 2002/0184239 A1* | 12/2002 | Mosher, Jr. | G06F 11/1471 |
| 2004/0024797 A1* | 2/2004 | Berry | G06F 11/3466 |
| 2004/0078379 A1 | 4/2004 | Hinshaw et al. | |
| 2004/0193612 A1* | 9/2004 | Chang | G06F 17/30864 |
| 2004/0213387 A1 | 10/2004 | Chandrasekaran | |
| 2005/0050112 A1* | 3/2005 | Chandrasekaran | G06F 17/30353 |
| 2006/0259518 A1 | 11/2006 | Lomet et al. | |
| 2007/0033240 A1* | 2/2007 | Barsness | G06F 12/0253 |
| 2007/0198781 A1 | 8/2007 | Dice et al. | |
| 2008/0034172 A1 | 2/2008 | Duffy et al. | |
| 2008/0228795 A1 | 9/2008 | Lomet | |
| 2008/0235245 A1* | 9/2008 | Huras | G06F 9/466 |
| 2008/0270489 A1 | 10/2008 | Kharatshvili et al. | |
| 2009/0116412 A1* | 5/2009 | Yanagihara | H04L 12/185 370/256 |
| 2009/0132535 A1 | 5/2009 | Surtani et al. | |
| 2009/0177658 A1 | 7/2009 | Brantner et al. | |
| 2009/0287703 A1 | 11/2009 | Furuya | |
| 2011/0302277 A1* | 12/2011 | Baker | G06F 17/30575 709/219 |

OTHER PUBLICATIONS

Svobodova, L., "A Reliable Object-Oriented Data Repository for a Distributed Computer System", Proceedings of the 8th ACM Symposium on Operating Systems Principles, vol. 15, No. 5, Dec. 1981, pp. 47-58 (12 pages).

"TPC Benchmark C", Transaction Processing Performance Council, 2005, 128 pages.

Wilson, A., "Distributed Transactions and Two-Phase Commit", 2003, 39 pages.

Yang, Y., "The adaptive serializable snapshot isolation protocol for managing database transactions", M.Comp.Sc. Thesis, Computer Science Department, University of Wollongong, Feb. 2007, 11 pages.

Adya, et al., "Efficient Optimistic Concurrency Control", Proceedings of the ACM SIGMOD International Conference on Management, May 1995 (12 pages).

Adya, A., "Weak Consistency: A Generalized Theory and Optimistic Implementations for Distributed Transactions", Ph.D. Thesis, Department of Electrical Engineering and Computer Science, MIT, Mar. 1999 (198 pages).

Alomari, M., "Ensuring Serializable Executions with Snapshot Isolation DBMS", Ph.D. Thesis, Department of Engineering and Information Technologies, University of Sydney, Australia, Dec. 2008 (171 pages).

Alomari, M. et al., "The Cost of Serializability on Platforms That Use Snapshot Isolation", Proceedings of the 24th International Conference on Data Engineering, 2008, pp. 576-585 (10 pages).

Badal, D.Z., "Correctness of Concurrency Control and Implications in Distributed Databases", Proceedings of the IEEE Computer Society's Third International Computer Software and Applications Conference, 1979, pp. 588-593 (6 pages).

Bayer, et al., "Parallelism and Recovery in Database Systems", ACM Transactions on Database Systems, vol. 5, No. 2, Jun. 1980, pp. 139-156 (18 pages).

Berenson, et al., "A Critique of ANSI SQL Isolation Levels", Proceedings of the 1995 ACM SIGMOD International Conference on Management of Data, vol. 24, No. 2, May 1995, pp. 1-10 (10 pages).

Bernstein et al., "Semantic Conditions for Correctness at Different Isolation Levels", ICDE, 2000, pp. 57-66 (10 pages).

Bernstein et al., "Multiversion Concurrency Control—Theory and Algorithms", ACM Transactions on Database Systems, vol. 8, No. 4, Dec. 1983, pp. 465-483 (19 pages).

Bryant, R.M., "SIMPAS: A Simulation Language Based on PASCAL", Proceedings of the 1980 Winter Simulation Conference, 1980, IEEE Press, Piscataway, NJ, pp. 25-40 (16 pages).

Carey, M., "Modeling and Evaluation of Database Concurrency Control Algorithms", Chapters 2-4, "Concurrency Control Costs," "Currency Control Performance," and "Performance Enhancement Schemes," Ph.D. Thesis, Computer Science Division (EECS), University of California, Berkeley, Aug. 1985, pp. 17-164 (148 pages).

Carey, M., "Multiple Versions and the Performance of Optimistic Concurrency Control", Computer Sciences Technical Report #517, Oct. 1983 (28 pages).

Casanova, M., "The Concurrency Control Problem for Database Systems", Chapters 2-7 "Database Systems", Ph.D. Thesis, Computer Science Department, Harvard University, 1979, pp. 19-82. (64 pages).

Chan et al., "The Implementation of an Integrated Concurrency Control and Recovery Scheme", Proceedings of the 1982 ACM SIGMOD International Conference on Management of Data, 1981, New York, NY, pp. 184-191 (8 pages).

Eswaran et al., "The Notions of Consistency and Predicate Locks in a Database System", Communications of the ACM, vol. 19, No. 11, Nov. 1976, pp. 624-632 (9 pages).

Avni, H., "A Transactional Consistency Clock Defined and Optimized", (Dissertation), School of Computer Science, Tel-Aviv University, May 2009, 58 pages.

Fekete, A., "Allocating Isolation Levels to Transactions", Proceedings of the 24th ACM SIGMOD-SIGACT-SIGART Symposium on Principles of Database Systems, Jun. 13-15, 2005, Baltimore, Maryland, pp. 206-215, 10 pages.

Fekete et al., "Making Snapshot Isolation Serializable", ACM Transaction on Database Systems, vol. 30, No. 2, Jun. 2005, pp. 492-528, 37 pages.

Fekete et al., "A Read-Only Transaction Anomaly Under Snapshot Isolation," SIGMOD Record, vol. 33, No. 3, Sep. 2004, pp. 12-14, 3 pages.

Fekete, A., "Serialisability and Snapshot Isolation", Proceedings of Australian Database Conference, Australian Computer Society, Jan. 1999, pp. 201-210, 9 pages.

Gray et al., "Transaction Processing: Concepts and Techniques", Chapters 7 and 8, Morgan Kaufmann, 1993, pp. 375-485.

Hadzilacos, T., "Serialization Graph Algorithms for Multiversion Concurrency Control", Proceedings of the 7th ACM SIGACT-SIGMOD-SIGART Symposium on Principles of Database Systems, New York, NY, 1988, pp. 135-141, 7 pages.

Hellerstein, J., "Concurrency Control: Locking, Optimistic, Degrees of Consistency", Spring 2008, UC Berkeley, CA, 6 pages.

Jorwekar et al., "Automating the Detection of Snapshot Isolation Anomalies", Proceedings of the 33rd International Conference on VLDB, Sep. 23-28, 2007, Vienna, Austria, pp. 1263-1274, 12 pages.

Kung et al., "On Optimistic Methods for Concurrency Control", ACM Transactions on Database Systems, vol. 6, No. 2, Jun. 1981, pp. 213-226, 14 pages.

(56) References Cited

OTHER PUBLICATIONS

Lam et al., "Real-time Optimistic Concurrency Control Protocol with Dynamic Adjustment of Serialization Order", Proceedings of the Real-Time Technology and Applications Symposium, 1995, pp. 174-179, 6 pages.
Lamport L., "Times, Clocks, and the Ordering of Events in a Distributed System", Communications of the ACM, vol. 21, No. 7, Jul. 1978, pp. 558-565, 8 pages.
Lampson et al., "A New Presumed Commit Optimization for Two Phase Commit", Proceedings of the 19th International Conference on Very Large Data Bases, 1993, Morgan Kaufmann Publishers Inc., San Francisco, CA, 9 pages.
Lomet et al., "Rollback Databases", Cambridge Research Laboratory, Cambridge, MA, Jan. 10, 1992, 44 pages.
Lomet, D., "Using Timestamping to Optimize Two Phase Commit", Proceedings of the Second International Conference on Parallel and Distributed Information Systems, San Diego, Currently Amended, 1993, 8 pages.
Olson et al., "Berkeley DB", Proceedings of the FREENIX Track, 1999 USENIX Annual Technical Conference, Monterey, CA, Jun. 6-11, 1999, 10 pages.
"Optimistic Concurrency Control", Wikipedia, The Free Encyclopedia, Retrieved at <<http:/en.wikipedia.org/w/index.php?title=Optimistic_concurrecy_control&Printable=yes>>, on Mar. 2, 2012, 3 pages.
"Oracle® Database Concepts", 10g Release 1 (10.1), Part No. B10743-01, Chapter 13 entitled "Data Concurrency and Consistency", Dec. 2003, Chapter 13, pp. 13-1 to 13-38, 38 pages.
Paulley, G., "Why Snapshot Isolation Is So Useful", Sybase Blog, May 19, 2009, 5 pages.
Raz, Y., "Commitment Ordering Based Distributed Concurrency Control for Bridging Single and Multi Version Resources", RIDE-IMS, 1993, pp. 189-198, 10 pages.
Reed, D.P., "Implementing Atomic Actions on Decentralized Data", ACM Transactions on Computer Systems, vol. 1, No. 1, Feb. 1983, pp. 3-23, 21 pages.
Ries et al., "Effects of Locking Granularity in a Database Management System", ACM Transactions on Database Systems, vol. 2, No. 3, Sep. 1977, pp. 233-246, 14 pages.
Ries et al., "Locking Granularity Revisited," ACM Transactions on Database Systems, vol. 4, No. 2, Jun. 1979, pp. 210-227, 18 pages.
Ries, D., "The Effects of Concurrency Control on Database Management System Performance", Chapter 2 entitled "Centralized Database Systems," Ph.D. Thesis, Department of Electrical Engineering and Computer Science, University of California at Berkeley, 1979, pp. 14-93, 80 pages.
Robinson, J. "Design of Concurrency Controls for Transaction Processing Systems," Chapter 4 entitled "A General Paradigm for Concurrency Controls", Ph.D. Thesis, Department of Computer Science, Carnegie-Mellon University, 1982, pp. 28-61, 34 pages.
Sargent. R., "Statistical Analysis of Simulation Output Data," ACM SIGSIM Simulation Digest, vol. 7, No. 4, Jul. 1976, pp. 21-31, & 52, 12 pages.
Shi et al., "A New Method for Concurrency Control in Centralized Database Systems," Proceedings of the ISCA 17th International Conference, Computers and Their Applications, Apr. 4-6, 2002, pp. 184-187, 4 pages.

Shi et al., "Read-Commit Order for Concurrency Control in Centralized High Performance Database Systems," International Information Institute, Information vol. 7, No. 1, 2004, pp. 95-105, 11 pages.
Stearns et al. "Distributed Database Concurrency Controls Using Before-Values," Proceedings of the 1981 ACM SIGMOD International Conference on Management of Data, ACM, 1981, New York, NY, pp. 74-83, 10 pages.
Sullivan, D., "Using Probabilistic Reasoning to Automate Software Tuning," Ph.D. Thesis, Department of Computer Science, Harvard University, Cambridge, MA, Sep. 2003, 227 pages.
Cahill et al., "Serializable Isolation for Snapshot Databases", SIGMOD '08, Jun. 9-12, 2008, Vancouver, BC, Canada, pp. 729-738, 10 pages.
Non-Final Office Action dated May 3, 2012 from U.S. Appl. No. 12/908,749, 12 pages.
Response filed Jul. 13, 2012 to Non-Final Office Action dated May 3, 2012 from U.S. Appl. No. 12/908,749, 13 pages.
Notice of Allowance dated Sep. 18, 2012 from U.S. Appl. No. 12/908,749, 11 pages.
Non-Final Office Action and Examiner Initiated Interview Summary dated Mar. 29, 2012 from U.S. Appl. No. 12/641,961, 25 pages.
Applicant Initiated Interview Summary and Office Action Apendixes dated Jun. 13, 2012 from U.S. Appl. No. 12/641,961, 7 pages.
Response filed Jul. 13, 2012 to Non-Final Office Action dated Mar. 29, 2012 from U.S. Appl. No. 12/641,961, 12 pages.
Notice of Allowance dated Nov. 23, 2012 from U.S. Appl. No. 12/641,961, 10 pages.
Preliminary Amendment filed Nov. 30, 2012 from U.S. Appl. No. 13/691,018, 7 pages.
Non-final Office Action dated Jun. 13, 2014 from U.S. Appl. No. 13/691,018, 8 pages.
Response filed Jul. 21, 2014 to Non-final Office Action dated Jun. 13, 2014 from U.S. Appl. No. 13/691,018, 8 pages.
Notice of Allowance dated Sep. 10, 2014 from U.S. Appl. No. 13/691,018, 7 pages.
Notice of Allowance dated Apr. 14, 2015 from U.S. Appl. No. 13/691,018, 7 pages.
Corrected Notice of Allowability dated May 20, 2015 from U.S. Appl. No. 13/691,018, 2 pages.
First Office Action dated Mar. 1, 2013 from Chinese Patent Application No. 201110339865.7, 3 pages.
Response filed Mar. 29, 2013 to First Office Action dated Mar. 1, 2013 from Chinese Patent Application No. 201110339865.7, 17 pages.
Second Office Action dated Jul. 31, 2013 from Chinese Patent Application No. 201110339865.7, 6 pages.
Response filed Aug. 5, 2013 to Second Office Action dated Jul. 31, 2013 from Chinese Patent Application No. 201110339865.7, 11 pages.
Third Office Action dated Nov. 14, 2013 from Chinese Patent Application No. 201110339865.7, 6 pages.
Notice on Grant dated Apr. 8, 2014 from Chinese Patent Application No. 201110339865.7, 6 pages.
Ferrari, Domenico, "Computer Systems Performance Evaluation," Prentice-Hall, Englewood Cliffs, New Jersey, 1978, 554 pages.

* cited by examiner

DISTRIBUTED TRANSACTION MANAGEMENT

CROSS-REFERENCE

This application is related to co-pending U.S. patent application Ser. No. 12/641,961, filed Dec. 18, 2009, and entitled "OPTIMISTIC SERIALIZABLE SNAPSHOT ISOLATION," which is herein incorporated by reference in its entirety.

TECHNICAL FIELD

The subject disclosure relates to transaction management and, more specifically, to handling of distributed transactions using multiversioning.

BACKGROUND

A database system can implement various mechanisms in order to ensure that transactions executed on the database system produce a correct result. In particular, a database system can implement a concurrency control mechanism to isolate multiple concurrently executing transactions from each other and/or to prevent such transactions from interfering with one another. However, while concurrency control mechanisms are useful for correctness, they add overhead and negatively affect system performance (e.g., throughput and response time). One class of concurrency control mechanism is designed for systems with multiversioning, that is, where the database system may store multiple versions of a record with different versions having non-overlapping valid time intervals.

A database system can be a distributed database system, wherein the database is distributed over multiple disparate computers or nodes. In a distributed database, some transactions may be local or global. A local transaction is restricted to a single node, while a global transaction involves multiple nodes. A user is normally not aware of whether a transaction is local or global, as the transaction is handled "behind the scene" by the database system. Consequently, it would be desirable for a distributed database system to implement mechanisms for handling both local and global transactions that are complete, efficient and scalable. For instance, a local transaction executed by a distributed database system should incur minimal or no additional overhead over that associated with a transaction executed in a local database system. As another example, substantially all isolation levels supported for local transactions should also be supported for global transactions. As yet another example, transactions executed by a distributed database system should not require a frequently accessed global node, and in particular a global clock, in order to avoid performance and scalability loss associated with use of a global node and/or clock. As still another example, transactions executed by a distributed database system should not cause distributed deadlocks because such deadlocks are difficult and expensive to detect.

Conventionally, various solutions have been proposed for distributed transaction management in distributed database systems. However, none of the solutions proposed for distributed databases with multiversioning has addressed all of the above requirements, and such a solution would be desirable to significantly improve performance of distributed database systems The above-described deficiencies of today's distributed transaction management techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Various embodiments as provided herein are targeted for systems that implement multiversioning, e.g., wherein the system may contain multiple versions of the same record with non-overlapping valid time intervals. A transaction specifies its logical read time, which determines the version of a record that is visible to the transaction. Read times and valid time intervals are based on a logical clock that is implemented as, e.g., a monotonically increasing counter.

Further, the embodiments herein can facilitate consistency and accuracy of a system with multiversioning. For example, let T1 be a global transaction that has modified data at several nodes. In a distributed system with multiversioning and without a global clock, problems arise in guaranteeing that another global transaction T2 obtains a transactionally consistent view, e.g., either T2 sees T1's updates everywhere or nowhere.

Accordingly, the commit protocol used in a system as described in various embodiments herein ensures that the same commit timestamp is used on all nodes that a transaction T1 touches. Accordingly, provided a subsequent transaction T2 uses the same logical read time on all nodes, T2 can be configured to see the updates generated by T1, either everywhere or nowhere within the system.

In other embodiments, various optimizations and/or other techniques are employed. These include, for example, (1) the use of a global transaction coordinator that reduces the overhead of commit processing by batching communication with participants, (2) keeping local clocks approximately in synchronization by piggybacking information on the messages sent by a global transaction coordinator, and (3) preventing premature garbage collection at a node by piggybacking information on the messages sent by a global transactions coordinator.

In one or more embodiments, distributed transaction management is implemented by facilitating synchronization among local clocks associated with participants in a global transaction. In one non-limiting implementation, respective nodes participating in a global transaction agree upon a commit timestamp to be used for the transaction. Such an agreement is reached individually or with the aid of a transaction coordinator. In addition, one or more nodes participating in the global transaction may advance their respective local clocks in accordance with an agreed upon commit timestamp.

In an embodiment, committing a distributed transaction is implemented via a modified version of two-phase commit (2PC) in which a designated node in a system, referred to herein as the transaction coordinator, collects commit timestamp votes from nodes participating in the transaction. A commit timestamp vote is generated at a given participating node based on the local clock of the participating node. A global commit timestamp is then determined, e.g., calculated, based on collected votes, and the global commit timestamp is subsequently provided to the participating nodes for use in the corresponding distributed commit. To conform with the global commit timestamp, one or more participating nodes may advance their local clocks.

Systems and methods described herein further include provisions by which nodes in a distributed system may synchronize their local clocks independently of a global transaction. By way of non-limiting example, a designated node facilitates the communication of "heartbeat" information. Based on this information, or any other suitable information, respective nodes adjust their local clocks. Heartbeat information or other synchronization information is transmitted at regular or irregular intervals in order to ensure that local clocks at respective nodes stay approximately synchronized.

Other systems and methods described herein include mechanisms by which a node returns, together with the response to a request from a given node, the identities of the node(s) involved in generating the result of the request. In this manner, the root node of a global transaction can be made aware of the nodes involved in the transaction without requiring intervention from a global entity. Further, the type of access (e.g., read or write) conducted by respective nodes involved in generating the result of the transaction is returned along with the identities of the respective nodes, thereby facilitating a greater depth of information at the requesting node.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
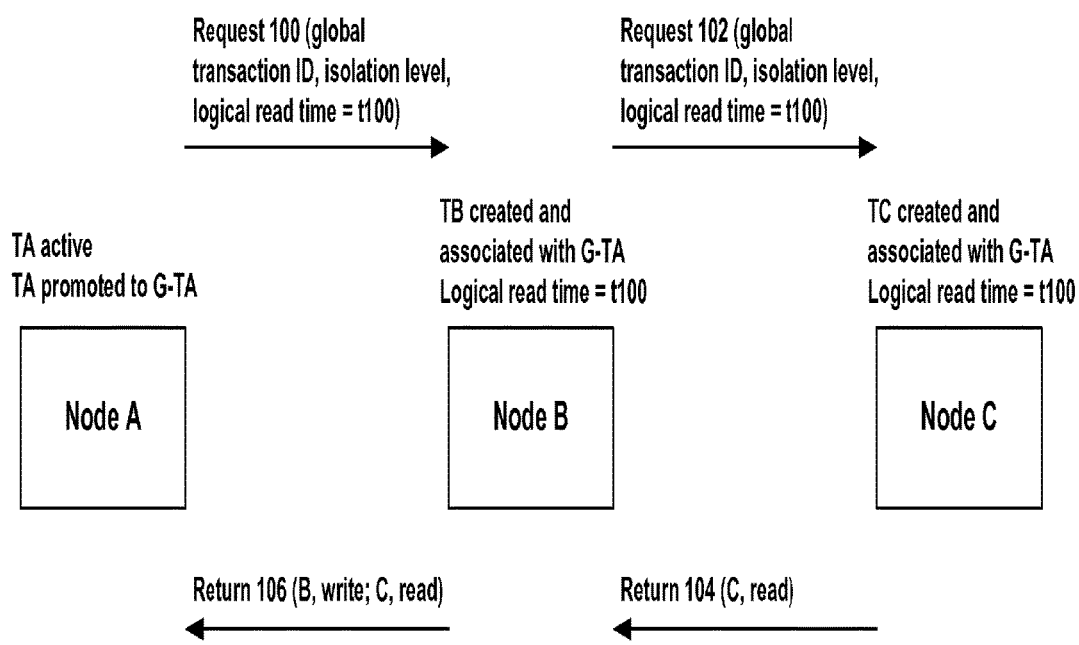
FIG. 1 is an illustrative overview of exemplary global transaction processing.

By way of introduction, database systems can facilitate management of respective associated data items by way of operations such as, but not limited to, data creation and maintenance, information retrieval, data access via searching or other mechanisms, and so on. In some embodiments, a database system can provide various mechanisms to ensure the recoverability and integrity of associated data. For example, a database system can manage operations performed within the system (e.g., associated with respective transactions executed by the database system) in order to ensure that such operations produce a correct result. By way of example, and not limitation, a database system can incorporate concurrency control mechanisms to ensure that respective transactions concurrently executed by a database system do not interfere with each other. In addition, a database system can incorporate various other mechanisms to ensure proper operation. As non-limiting examples, a database system can utilize various mechanisms that ensure consistency, integrity, and/or recoverability of data associated with the system.

In one example, database systems can be utilized to manage information stored in at least one data store. By way of example, and not limitation, an in-memory database can be designed and implemented to manage data stored in a corresponding computer memory or any other suitable non-transitory computer storage medium. Various non-limiting embodiments of in-memory database systems, or other database systems which can be used to provide similar functionality, can generally provide low-level functionality with respect to an associated data store. Such functionality can include, for example, support for transactions and/or lookup, cursors, and the like. In addition, such database systems can provide support for various higher-level functions, either directly or indirectly through cooperation with one or more disparate systems that provide such functionality. Examples of higher-level functionality that can be directly or indirectly supported by a database system include, but are not limited to, generation or control of an associated user interface, support for queries based on various query languages (e.g., the American National Standards Institute (ANSI)/International Standards Organization (ISO) structured query language (SQL), XQuery, etc.), and so on.

Some database systems are designed and optimized for use on a single computer, e.g., such that the data stores associated with the database system are restricted to one device. However, restriction of a database system to a single machine limits the size of the data store(s) or the total workload that can be handled by the system due to local storage constraints or other concerns. Accordingly, distribution of a database system over multiple computing devices is desirable in some cases. For example, it can be observed that an enterprise user of a database system that wishes to implement a database system to manage a significantly large amount of data may want to distribute storage of the data over multiple machines due to per-machine storage limits, redundancy concerns, reduction of maintenance costs associated with large servers, or the like.

Thus, database systems that can manage a distributed set of data stores are desired. However, in order to provide functionality and performance comparable to a local system, management of distributed transactions should satisfy various desiderata. By way of specific example, and not limitation, these desiderata can include the following. First, the system should incur no additional overhead on local transactions, e.g., transactions touching only a single node. Second, all isolation levels supported for local transactions should also be supported for global transactions, e.g., transactions touching multiple nodes. Third, there should be no frequently accessed global node, and in particular no global clock. Fourth, the system should be capable of operation with no distributed deadlocks. While various conventional distributed database management solutions exist, no such solution exists that satisfies all the above desiderata. In consideration of these and other deficiencies of existing distributed database transaction management systems, the subject disclosure presents a variety of embodiments directed to achieving high-performance and low-latency distributed transaction management.

In this regard, in various embodiments as set forth herein, distributed transaction management schemes are proposed that address each of the desiderata described above, thereby enabling support for larger database systems and/or distributed database systems on comparatively small and inexpensive servers. In addition, other benefits of the transaction management schemes are provided herein. It can be appreciated that the benefits of various embodiments as described herein are intended solely as non-limiting examples of benefits that can be realized via use of such embodiments. Further, the respective schemes provided herein are not intended to be regarded as preferred over one another with respect to any of the stated benefits and/or any other benefits that can be realized from such schemes.

In some embodiments, a commit protocol can be utilized by a distributed transaction management mechanism that uses only local clocks, e.g., local transaction event counters, or any other suitable tracking measurements at respective database nodes. Local clocks can be synchronized as part of committing a global transaction. By way of non-limiting example, the value of a local clock can be advanced during the commit of a transaction to ensure that some or all participants in the commit have the same commit timestamp. Further, it is to be appreciated that in the various embodiments herein, a timestamp is not restricted to an actual time. Counters or a tickcount can also be used to represent timestamps, e.g., any data that represents progression.

In other embodiments, a "heartbeat" mechanism or other means can be used to synchronize nodes such that local clocks at respective database nodes are prevented from drifting too far from each other. Techniques for implementing synchronization in this manner are described in further detail herein.

Various embodiments herein are based on aspects of the behavior of global transactions. Specific, non-limiting examples of these aspects are as follows. It can be appreciated that some of the embodiments described herein may consider some, all, or none of these aspects. Further, it can be appreciated that the various embodiments presented herein are not intended to be limited to any of the below aspects unless explicitly stated otherwise. Accordingly, as a first example aspect, the same logical read time is used by all participants in a global transaction. In a second aspect, when a node returns the result of a remote request, it also includes a list of the nodes that were involved in generating the result and the type of access (e.g., read or write) on the listed nodes. This enables the originating node, or root node, of the transaction to keep track of the participants of the transaction. In a third aspect, the participants in a global transaction use the same commit timestamp and in some cases may advance their respective local clocks to ensure that the commit timestamps among the participants are the same. In a fourth aspect, distributed commit is handled by a modified version of two-phase commit that includes an extra phase to collect commit timestamp votes from participants.

In one embodiment, a distributed database transaction management system includes a distributed transaction management component configured to enforce atomicity of a transaction operating on data at a plurality of distributed database nodes by facilitating synchronization of a commit timestamp used by the plurality of distributed database nodes in committing the transaction, wherein the commit timestamp is synchronized without reference to a global clock globally available to the plurality of distributed database nodes.

The distributed transaction management component can be further configured to synchronize a logical read time used by the transaction across the plurality of distributed database nodes. Additionally or alternatively, the distributed transaction management component can be configured to communicate a heartbeat message that includes data relating to a system time. This heartbeat message can facilitate synchronization between respective local clocks at the plurality of distributed database nodes at least in part by triggering advancement of the respective local clocks in conformance with the system time.

In some implementations, at least one distributed database node operates as a coordinator for a given transaction and includes the distributed transaction management component. In such an implementation, the distributed transaction management component can be configured to operate on a per-transaction basis. Further, multiple distributed database nodes can be configured to simultaneously manage respective transactions via respective distributed transaction management components.

In other implementations, at least one distributed database node of the plurality of distributed database nodes is configured to manage a grouping of transactions associated with the plurality of distributed database nodes via the distributed transaction management component.

Further, the distributed transaction management component can include a commit timestamp synchronizer component configured to collect commit time votes from the plurality of distributed database nodes and to facilitate synchronization of the commit timestamp used by the plurality of distributed database nodes in committing the transaction based at least in part on the commit time votes. Additionally or alternatively, the commit timestamp synchronizer component may be configured to facilitate advancement of local clocks respectively associated with at least one distributed database node of the plurality of distributed database nodes in conformance with the commit timestamp.

A transaction conducted as generally described herein can be committed at a plurality of data stores based at least in part on a two-phase commit procedure, which may be modified as described herein and/or in any other suitable manner.

In other implementations, the distributed transaction management component is associated with a global transaction coordinator. In one example, the global transaction coordinator manages all transactions associated with the plurality of distributed database nodes. In another example, the global transaction coordinator can be configured to incorporate system time information into respective messages communicated to respective distributed database nodes of the plurality of distributed database nodes. In such an example, the system time information facilitates synchronization of local clocks associated with the respective distributed database nodes of the plurality of distributed database nodes. Additionally or alternatively, the global transaction coordinator can be configured to incorporate active transaction information into respective messages communicated to respective distributed database nodes of the plurality of distributed database nodes. In such an example, the active transaction information facilitates control of garbage collection performed by the respective distributed database nodes of the plurality of distributed database nodes.

In another embodiment, a method for managing a distributed database transaction includes receiving information relating to a transaction operating on data in data stores associated with respective participating nodes associated with the transaction, requesting commit time votes from the respective participating nodes, receiving, e.g., collecting, the commit time votes from the respective participating nodes in response to the requesting, computing a global commit timestamp for the transaction based at least in part on the commit time votes, and synchronizing commitment of the transaction at the respective participating nodes to the global commit timestamp.

The method, in some implementations, can include obtaining local clock values corresponding to one or more nodes of the respective participating nodes, generating system time information based at least in part on the local clock values, and communicating the system time information to the respective participating nodes. In other implementations, the method can include receiving begin timestamps of respective oldest active transactions of respective participating nodes, identifying a globally oldest active transaction from among the respective participating nodes, and communicating a begin timestamp of the globally oldest active transaction to the respective participating nodes.

In further implementations, commitment of a transaction processed according to the method can be synchronized at the respective participating nodes according to, e.g., a two-phase commit procedure, a three-phase commit procedure, or a Paxos protocol.

In another embodiment, a method for managing a distributed database transaction includes receiving information relating to a distributed database transaction from a transaction coordinator associated with the distributed database transaction, determining a commit time vote for the distributed database transaction based at least in part on a local clock, communicating the commit time vote for the distributed database transaction to the transaction coordinator, receiving a global commit timestamp from the transaction coordinator, and synchronizing commitment of the distributed database transaction to the global commit timestamp.

If the global commit timestamp as described in the above method indicates a time that is prior to a time associated with the local clock, the above method can include sending a retry request for the global transaction to the transaction coordinator.

In some implementations, the method above can further include identifying system time information within one or more messages received from the transaction coordinator and advancing the local clock to the system time information.

In other implementations, the method can further include receiving a begin timestamp of an oldest active transaction from the transaction coordinator and configuring garbage collection such that the garbage collection does not proceed beyond the begin timestamp of the oldest active transaction.

In further implementations, the above method can include receiving a remote request from a requesting database node corresponding to the distributed database transaction, creating a local transaction corresponding to the distributed database transaction, compiling a list of database nodes involved in generating a result of the local transaction and access types utilized by respective database nodes in the list of database nodes, and returning the list of database nodes and the access types to the requesting database node in response to the remote request.

Herein, an overview of some of the embodiments for achieving distributed transaction management has been presented above. As a roadmap for what follows next, various exemplary, non-limiting embodiments and features for distributed transaction management are described in more detail. Then, some non-limiting implementations and examples are given for additional illustration, followed by representative network and computing environments in which such embodiments and/or features can be implemented.

Distributed Transaction Management

By way of further description with respect to one or more non-limiting ways to conduct normal transaction processing, an example global transaction is considered, illustrated generally by FIG. 1, that accesses data on three nodes, A, B, and C, and runs under a serializable isolation level. The transaction starts out as a local transaction TA on node A and acquires a begin timestamp e.g., t100, using the local clock of node A. In the example shown by FIG. 1, t100 is the logical read time that is to be used by all nodes participating in the transaction.

At some point in its processing, TA may seek to access data on node B. Accordingly, TA is promoted into a global transaction G-TA with A as its root node. Node A then sends a request 100 to node B that includes the global transaction ID (e.g., node ID plus local transaction ID), the isolation level of the transaction and the logical read time (t100) to be used. In response, node B creates a local transaction TB, associates it with the global transaction, and sets the logical read time of TB to t100. Processing associated with the transaction on node B can then proceed according to technique(s) as generally known and understood in the art.

In the event that node B seeks to access node C as part of its processing, node B can send a request 102 to node C that includes substantially similar information to request 100, e.g., global transaction ID, isolation level and logical read time. In response, node C creates a local transaction TC and proceeds as generally described above.

When node C returns its result to node B, it can provide a return report 104 to node B that also includes information indicative of which nodes participated in computing the result and the type of access (e.g., read or write) utilized by each node. By way of non-limiting example, TC may conduct read-only access of some data on C. Accordingly, node C provides a return report 104 of (C, read). Further, in the event that transaction TB updates some data on B, node B can provide a return report 106 to node A of (B, write; C, read). In this manner, it can be appreciated that information about which nodes participated in the global transaction and the type of access on such nodes flows back to the root node of the transaction.

A participant in a transaction records which local transaction corresponds to a global transaction such that it can facilitate processing of global transactions by their corresponding local transactions. A participant also records the transaction's isolation level such that it can decide which information to record during processing and what actions, if any, are to be done when the transaction is terminated.

While the above example relates to a transaction with serializable isolation, it can be appreciated that other levels of isolation can also be supported. With respect to support of other levels of isolation, there are of different levels of consistency assurances including dirty read (DR), read committed (RC), Repeatable Read (RR), serializable isolation, and snapshot isolation (SI), which may or may not be desirable depending on the particular application being served for the data.

Under DR isolation level, a transaction T1 always reads the latest version of a record regardless of whether the version is committed or not. If T1 reads a version created by a transaction T2 that subsequently aborts, then T1 has seen data that logically never existed. However, for some reporting or monitoring applications covering large amounts of data and where the exact values are not quite as important as the global trends in the data, the small error introduced by such reads may be acceptable.

Under RC isolation level, a transaction T1 reads the latest committed version while uncommitted versions are ignored. This has the effect that T1 may see some of the updates from a transaction T2 that committed during T1's lifetime, but also miss some of T2's updates. In other words, T1 does not have a transaction-consistent view of the data.

Under RR isolation level, the system guarantees that a transaction T1 is allowed to commit only if all versions that T1 read are still valid as of the end of the transaction.

Serializable isolation can be viewed as a form of repeatable read that further handles the problem of phantoms. The problem of phantoms is illustrated by the execution of a read operation of a transaction T1 when another transaction T2 may introduce and commit versions that fulfill the selection criteria of the read operation. At the end of T1, such versions are visible to T1 but, depending on the timing of the read operation, may not have been read during normal processing. Thus, data that was not present upon the start of the transaction may appear during the transaction, and thus the term "phantom" is used to imply its appearance "out of the blue." Accordingly, not only will SR guarantee that the items read during a transaction do not change by the end of the transaction but SR additionally guarantees that no new data within scope of the transactions reads are introduced until after the transaction concludes.

SI is still another form of isolation. Under SI, a transaction logically obtains its own snapshot of the data at transaction start time, which guarantees that read operations do not block and that the transaction has a consistent view of the data.

With respect to distributed commit processing, committing a global transaction is performed in accordance with an embodiment using two-phase commit, which is modified to include an additional round of messages to determine the commit timestamps of the transaction. For simplicity of explanation, and by way of specific, non-limiting example, it is assumed in the following discussion that a node not otherwise participating in the transaction acts as the transaction coordinator (TxnC). This is merely one use scenario that can be handled by the techniques described herein, as the TxnC can, of course, also be a participating node in the transaction. Further, the following discussion utilizes the basic two-phase commit protocol; however, it can be appreciated that other suitable distributed commit protocol or combination of protocols can be used, such as a three-phase commit procedure, a Paxos protocol, and/or any other suitable commit procedure or protocol.

Figure 2:
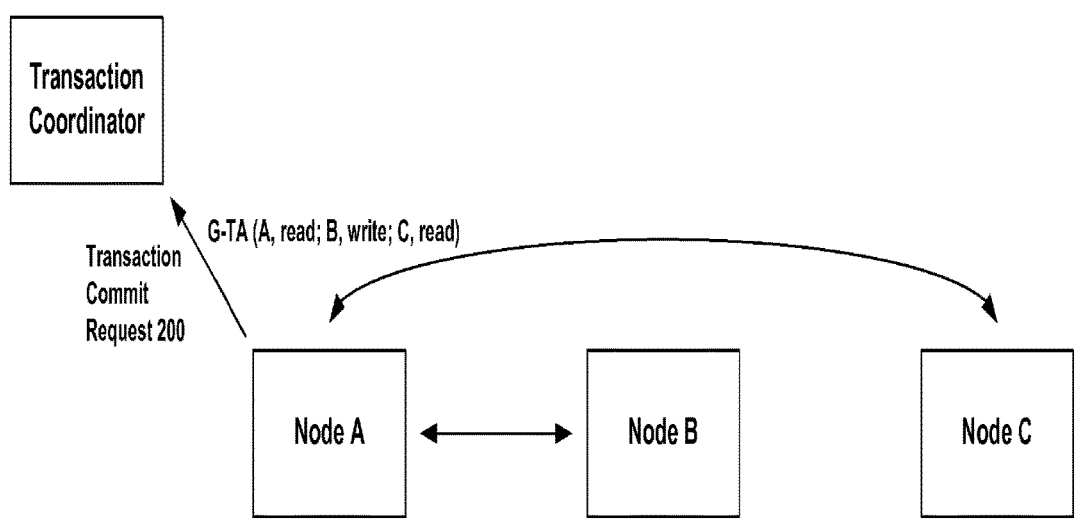
FIG. 2 is an illustrative view of exemplary transaction initiation in a distributed database system.

In one embodiment, commit processing is initiated by the root node of the transaction, e.g., node A, by sending a message to TxnC. An example initiation of commit processing is shown generally by FIG. 2, wherein node A provides a transaction commit request message 200 to TxnC. The message(s) provided to TxnC at the initiation of the transaction contains, among other possible information, the list of participants involved in their transaction and their respective access types.

Figure 3:
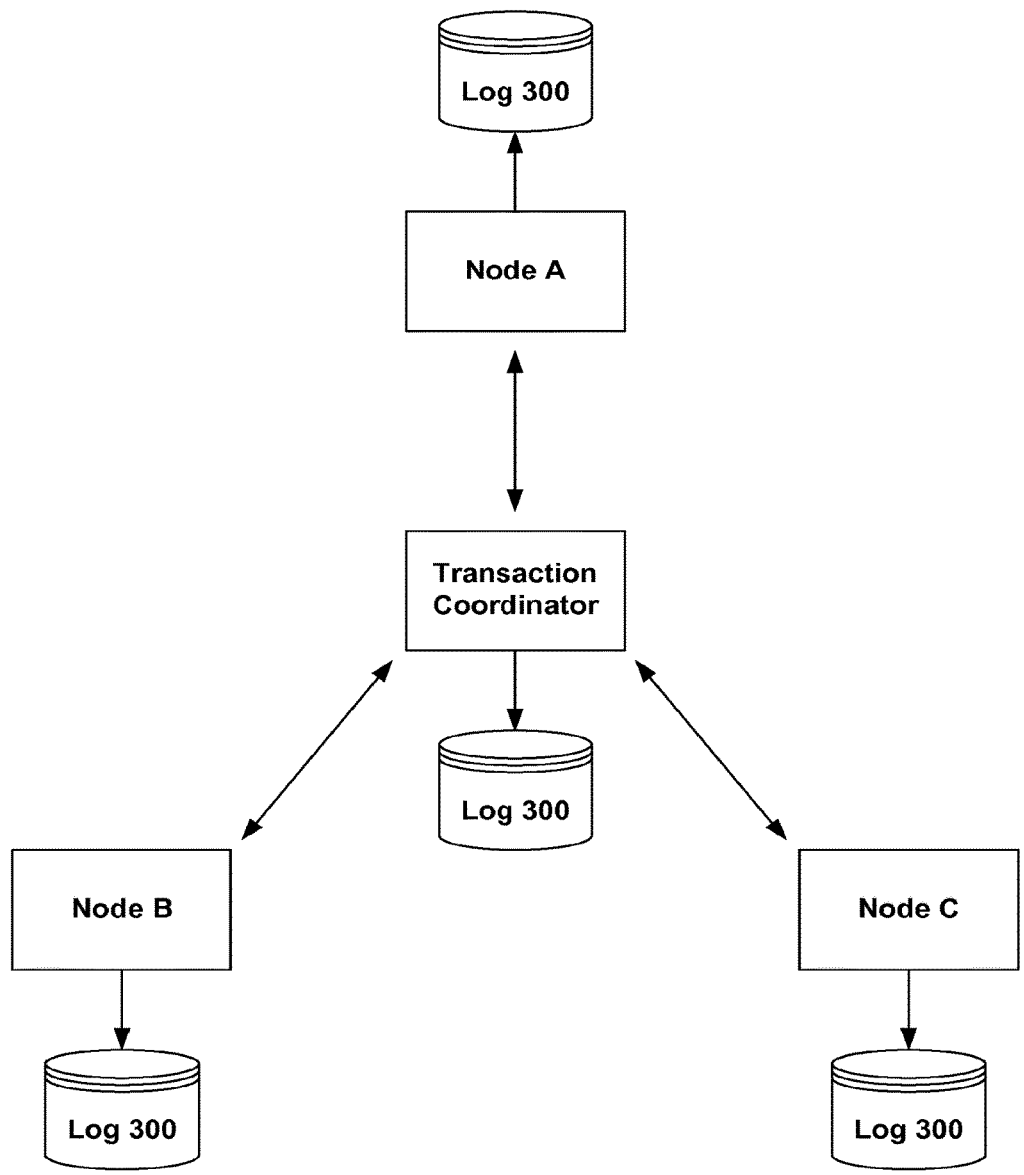
FIG. 3 is an illustrative overview of exemplary coordination of a global transaction in a distributed database system.

Upon transaction commit processing, participating nodes in the transaction and TxnC can communicate with each other as generally shown by FIG. 3. Example protocols for the coordinator and for participants follow. While the following description ignores timeouts, it can be appreciated that the protocols described below can be modified to handle timeouts and/or any other appropriate scenarios.

In general, the participating nodes in a distributed or global transaction leverage associated local clocks to maintain timestamps associated with maintained records. In a multiversioning system, these timestamps establish the valid time of respective versions of a record. For instance, if a record R is created at time t10 and updated at t25, the lifetime of one version of record R is from t10 to t25. Therefore, it is desirable to maintain synchronization between local clocks of respective nodes in order to prevent errors associated with accessing an incorrect version of a record at one or more nodes. For example, if a local clock at node A is out of synchronization with a local clock at node B, respective transactions operating on records at node A and node B may encounter inconsistency between the records on node A and node B, which in turn can cause the transactions to produce incorrect results. Accordingly, the protocols described herein provide mechanisms by which local clocks associated with participating nodes of a transaction can be synchronized in order to mitigate such errors. Further detail regarding timestamping and record versioning is provided later.

With respect now to example protocols, it can be appreciated that the following protocol is intended as a non-limiting example and that the various embodiments are not intended to be limited to any specific protocol(s) unless specifically stated otherwise.

Referring first to a transaction coordinator protocol, said protocol is conducted via the following steps.

(1) TxnC sends a precommit request to participants, asking for their votes on the commit time for the transaction.

(2) TxnC collects commit time votes from participants. In some cases, a participant may vote to abort the transaction at this stage. In this case, TxnC elects to abort the transaction and proceeds to step (8) below. Otherwise, TxnC computes the global commit time as the maximum of the votes, in some cases adding a delta value.

(3) TxnC sends a prepare request to participants and includes the global commit time in the message (4) TxnC collets the votes (e.g., commit, retry, or abort) from the participants.

(5) If any of the participants voted to abort the transaction, TxnC elects to abort and continues to step (8) below.

(6) If any of the participants voted to retry the transaction, TxnC returns to step (1) above and tries the commit again. In one embodiment, the number of retries can be limited to a maximum number.

(7) As all participants have voted to commit the transaction based on steps (5) and (6) above, TxnC elects to commit.

(8) TxnC force writes its decision to a log 300 (e.g., maintained as a persistent log).

(9) TxnC sends an abort or commit request to the participants, based on its decision to abort or commit the transaction.

(10) TxnC collects return messages from the participants.

(11) TxnC writes a transaction end record to its log 300 and ceases involvement in the transaction.

Referring next to an participant protocol, said protocol is conducted via the following steps.

(1) A participant P receives a precommit request for a global transaction GT from TxnC.

(2) If the corresponding local transaction LT at P has been aborted, P sends an abort vote to TxnC.

(3) Otherwise, P computes its vote for the commit time, e.g., as the local clock value plus a delta value, and sends it vote to TxnC. In one embodiment, a delta can be selected to leave sufficient time for local transaction activity until GT precommits.

(4) P receives an abort request or a prepare request with a commit timestamp from TxnC.

(5) If the request is to abort, P aborts LT and continues to step (11) below.

(6) If the request is to prepare, P checks the transaction commit timestamp. If the commit timestamp is less than P's local clock, P cannot commit the transaction and sends a retry vote to TxnC.

(7) Otherwise, P advances up its local clock to the next clock value following the commit timestamp, sets the end timestamp of LT to the commit timestamp, and determines whether LT can be committed according to the rules for local transactions used by the system. If LT cannot be committed, P aborts LT.

(8) If LT is ready to commit and this is the first try to commit GT, P force writes all new versions created by LT and a prepare record to a log 300 (e.g., maintained as a persistent log) and sends a commit vote to TxnC. Otherwise, P sends an abort vote.

(9) P receives a commit or abort request from TxnC.

(10) If the request is a commit request, P commits LT and, if LT is a read-write transaction, writes a commit record to the log 300. In one embodiment, the write does not have to be forced.

(11) If the request is an abort request, P aborts LT and, if LT is a read-write transaction, optionally writes an abort record to the log 300. In one embodiment, the write does not have to be forced.

(12) P sends TxnC a message indicating that the transaction has been committed or aborted, as decided above.

As the above example protocols illustrate, in the case where the commit succeeds on the first try, the transaction coordinator sends three messages (e.g., precommit, prepare and commit/abort) to the participants and performs two log writes, one of which is forced. The participants also send three messages (commit time vote, commit/abort vote, and committed/aborted) and, in the case that the local transaction is a read-write transaction, perform two log writes, one of which is forced. Alternatively, if the local transaction is read-only, no log writes may be performed.

The above commit protocol ensures that transactions, whether local or global, can obtain a transaction-consistent view of the database if a given isolation level so requires. Put another way, a transaction will see either all or none of the updates of another transaction.

By way of specific, non-limiting example, let T1 be a global transaction that modifies data on nodes A, B, and C and commits at time t100. When a second transaction T2 begins, it is unclear whether T2 is a local or global transaction. By way of further example, T2 can begin on a node D and, using the local clock, obtain a begin timestamp of t120. T2 uses this value as its read timestamp on all nodes, which ensures that it has a transaction-consistent view across nodes. Thus, if T2 reads from nodes A and B, the updates of T1 will be visible to T2 on both nodes. On the other hand, it can be appreciated if T2's begin timestamp is earlier than t100, e.g., t80, T2 will not see T1's updates at any node.

It is noted that if T2 begins on one of nodes A, B, or C after T1 commits, it is guaranteed to see the changes to T1 because its begin timestamp will be higher than the commit timestamp of T1. However, this is not guaranteed if T2 begins on some unrelated node because local clocks are not fully synchronized. In an embodiment, to avoid a case where clocks drift too far apart, clock synchronization rounds can be run at regular intervals. Such clock synchronization rounds can be performed via communication of "heartbeat" messages and/or any other suitable mechanisms. Synchronization procedures that can be utilized in accordance with various embodiments are described in further detail below.

It can be appreciated that the above approach satisfies the desired properties of a distributed transaction management scheme as described above. In particular, there is no overhead for local transactions. Further, all isolation levels are supported. In addition, no global clock or global coordinator is required; any node can serve as a transaction coordinator, and many global commits may be in progress concurrently. Finally, commit dependencies can be used as generally known in the art to avoid waiting (e.g., where a transaction cannot complete its prepare until all its outstanding dependencies have been resolved). Thus, neither local nor global deadlocks can occur.

With respect to handling of various isolation levels, it can be appreciated that the details of commit processing at a participating node can depend on the concurrency control method used, on the isolation level, and where the transaction performs writes. For instance, in case an optimistic concurrency control method is used, for read committed and snapshot isolation levels, no read validation is required but a local transaction may have outstanding commit dependencies because of, e.g., speculative reads. In one example, nodes without writes can be ignored by the transaction coordinator during the voting and commit/abort phases but not during the prepare phase. Further, such nodes need not write anything to the log. Accordingly, it can be appreciated that pure read-only transactions may require only one phase, e.g., distributing the commit request and collecting the replies.

In some cases, it may be desirable to reduce the messaging overhead associated with one or more protocols as described herein. It can be appreciated that a commit protocol can in some cases exhibit a high message overhead if each associated transaction is committed individually. For instance, a transaction that involves N nodes requires 6N messages. In one embodiment, this overhead can be significantly reduced by techniques that utilize a single global coordinator, message aggregation, and heartbeats, as generally described herein.

In one embodiment, the global coordinator broadcasts a message to all nodes at regular intervals (e.g., every 10 ms). The message can include precommit, prepare, and commit/abort requests that have accumulated since the previous message was sent. When a node receives the message, it extracts the requests for transactions it participates in and takes any appropriate action(s). The participant can subsequently collect its responses and any new commit requests into a return message, which can be sent back to the coordinator after a suitable interval, when the participant has completed respective required actions, and/or at any other suitable time. When return messages have arrived, the coordinator processes the responses and the process continues. In general, it can be appreciated that the above procedure can be utilized to implement group commit for global transactions. For example, in a similar manner to regular group commit, the above procedure sacrifices latency in favor of lower overhead and higher throughput.

In another embodiment, this heartbeat mechanism can be leveraged to keep local clocks loosely synchronized. When a participant sends a return message to the coordinator, the participant can also include the current value of its local clock. The coordinator keeps track of the maximum clock value it has received from the nodes in the system. Subsequently, when the coordinator broadcasts a message, it includes in the message the highest of those values. As a result, a participant can advance its local clock to the newly determined clock value upon receiving the message. By tightening clock synchronization via a heartbeat mechanism and/or other means, the risk of users experiencing "time warping" is reduced.

With regard to garbage collection of versions that are no longer required, it can be observed that unless garbage collection is synchronized across nodes, a global transaction may have to be aborted due to a node racing too far ahead and garbage collecting versions that the transaction may require for reading. For instance, a node in one example scenario may have discarded all versions that expired prior to time t100. If a global transaction with a logical read time less than t100 arrives at the node, the transaction have to be aborted because it cannot be guaranteed that all of the versions the transaction should see are available. To avoid such problems, garbage collection on a node can be configured such that it cannot proceed beyond the start time of the oldest active transaction in the system. In an embodiment, a transaction coordinator and/or other database entity can facilitate control of garbage collection in the above manner by incorporating active transaction information into messages communicated to respective database nodes.

In one embodiment, this issue can be addressed in the same way as clock synchronization. For instance, a participant can include the start time of the oldest active transaction on the node in its return message. The transaction coordinator keeps track of the latest reported value for each node. When it broadcasts a message, it includes the minimum among the values in the message. The participants then use this value to limit how far it allows garbage collection to proceed. By using this approach, it can be ensured that versions do not disappear from under global transactions.

While various embodiments are provided above in the context of a global transaction coordinator, it should be appreciated that transaction coordination can be implemented in any suitable manner. For instance, in addition to or in place of a global transaction coordinator (e.g., that manages all transactions associated with the system), transactions can be coordinated by respective database nodes on a per-transaction basis. In such an example, multiple database nodes may implement the distributed transaction management techniques and components provided herein. Further, respective database nodes can in some cases operate simultaneously or in otherwise overlapping time intervals to facilitate coordination of multiple transactions at a time.

In other implementations, one or more database nodes can operate as a transaction coordinator to manage a grouping of transactions (e.g., corresponding to a subset of all transactions associated with the system). In the event that multiple database nodes are configured in this manner, transactions can be distributed among the respective nodes via random selection and/or any other suitable distribution method(s). Further, such database nodes can operate simultaneously, as generally described above.

Figure 4:
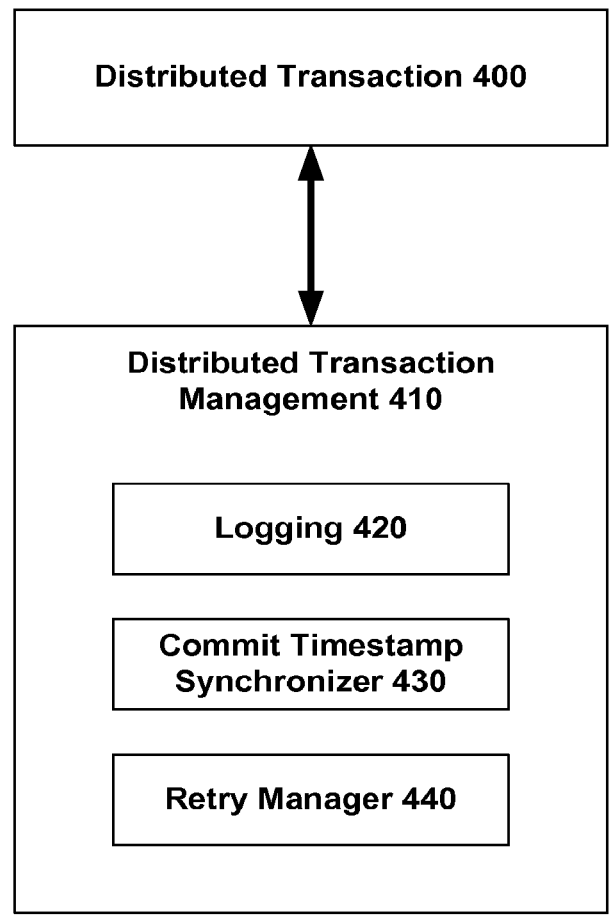
FIG. 4 is a block diagram showing exemplary functions of a distributed transaction management mechanism in accordance with one or more embodiments.

FIG. 4 is a block diagram showing an exemplary implementation of a distributed transaction management component 410. As shown in FIG. 4, a distributed transaction management component 410 can utilize a logging component 420, a commit timestamp synchronizer component 430, and/or a retry manager component 440 to facilitate processing of a distributed transaction 400. In various embodiments herein, a logging component 420 records read/write events associated with a distributed transaction 400 to a persistent log and/or another suitable data store.

Commit timestamp synchronizer component 430 facilitates synchronization of a commit timestamp between respective nodes participating in a distributed transaction 400. For example, a commit timestamp synchronizer component 430 operating at a transaction coordinator can compute a global commit timestamp to be utilized for a distributed transaction 400 and communicate this timestamp to participating nodes in the distributed transaction 400. In another example, a commit timestamp synchronizer component 430 operating at a participating node in a distributed transaction 400 can submit time votes or other information relating to a desired commit timestamp for the distributed transaction 400 and receive a global commit timestamp in return, based on which the node can advance its local clock to conform with the commit timestamp.

Retry manager component 440 is configured to repeat attempted initiation of a distributed transaction 400 if, e.g., a specified commit time for the distributed transaction 400 is insufficient for one or more participating nodes in the distributed transaction. For example, a node that receives a global commit timestamp for a distributed transaction that is prior to the local clock value of the node can utilize retry manager component 440 to request retrial of the transaction. Correspondingly, a transaction coordinator that receives a request to retry a transaction can utilize a retry manager component 440 to retry the transaction.

While distributed transaction management component 410 in FIG. 4 is illustrated as including components 420-440, it can be appreciated that a distributed transaction management system need not include each of components 420-440, as described generally with respect to the various embodiments herein. Further, it can be appreciated that, as appropriate, the functionality of distributed transaction management component 410 and its associated components 420, 430, and 440 may be combined or further subdivided.

Figure 5:
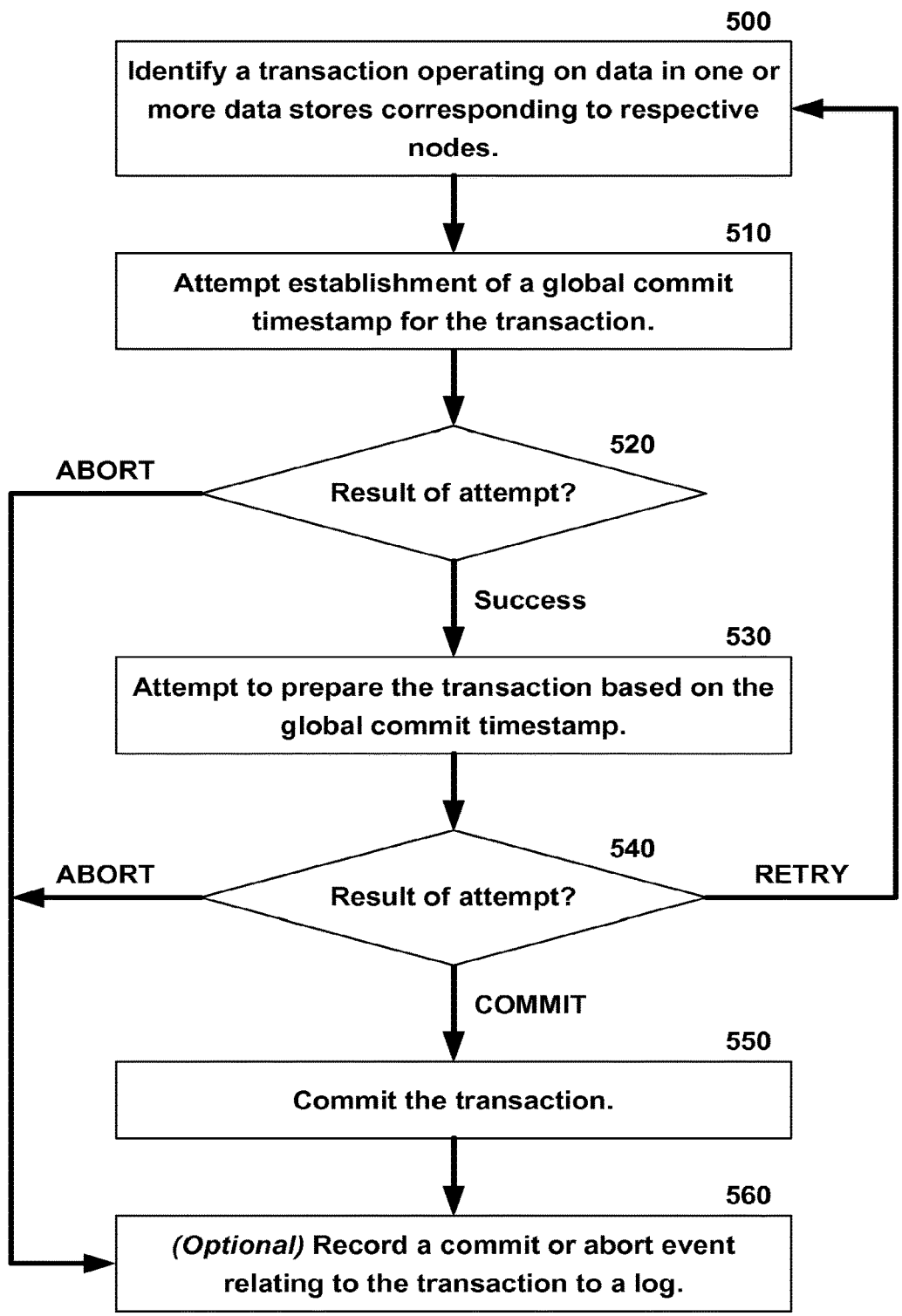
FIG. 5 is a flow diagram illustrating an exemplary non-limiting process for transaction management and node synchronization in a distributed database system.

FIG. 5 is a flow diagram illustrating an exemplary non-limiting process for initiating a distributed transaction in a database system. At 500, a transaction is identified that operates on data in one or more data stores corresponding to respective nodes. At 510, establishment of a global commit timestamp for the transaction is attempted. At 520, if the attempt results in an abort being requested, the process continues to 560. Otherwise, if the attempt is successful, at 530 an attempt is made to prepare the transaction based on the global commit timestamp. At 540, if a retry is requested as a result of this attempt, the process returns to 510. Further, if the transaction is requested to be aborted as a result of the attempt at 530, the process continues to 560. Otherwise, if the transaction is deemed ready for committing at 540, the transaction is committed at 550. At 560, a commit or abort event (e.g., as determined in the preceding acts of the process) is optionally recorded to a log.

Figure 6:
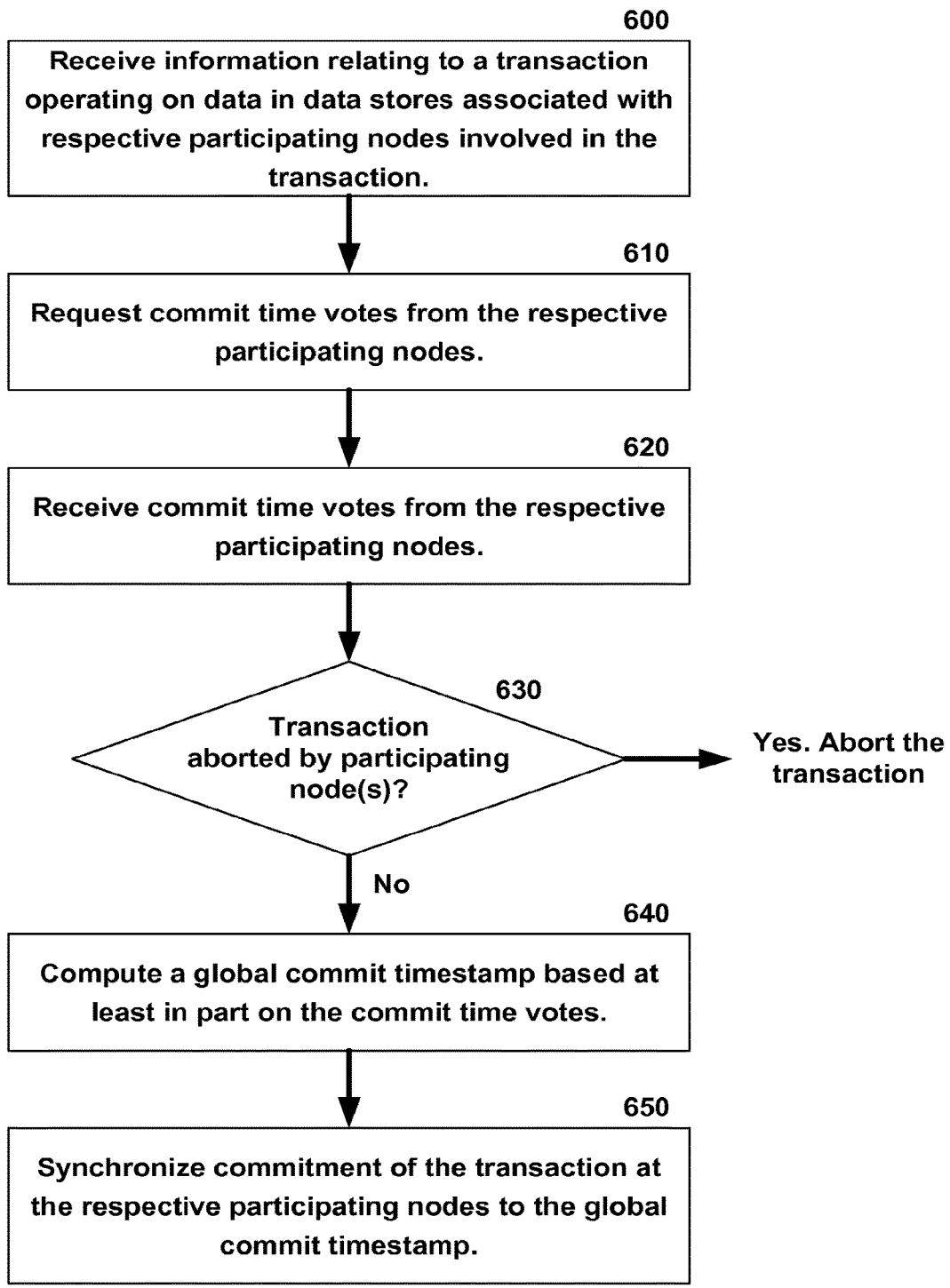
FIG. 6 is another flow diagram illustrating an exemplary non-limiting process for coordinating a set of nodes in a database system with respect to a distributed transaction.

FIG. 6 is a flow diagram illustrating an exemplary non-limiting process for coordinating a set of nodes in a database system with respect to a distributed transaction. At 600, information is received that relates to a transaction operating on data in data stores associated with respective participating nodes involved in the transaction. At 610, commit time votes are requested from the respective participating nodes. At 620, commit time votes are received from the respective participating nodes in response to the request at 610. At 630, if one or more of the commit time votes obtained at 620 indicate that the transaction has been aborted by one or more of the participating nodes, the transaction is aborted. Otherwise, at 640, a global commit timestamp is computed based at least in part on the commit time votes. At 650, commitment of the transaction is synchronized at the respective participating nodes to the global commit timestamp.

Figure 7:
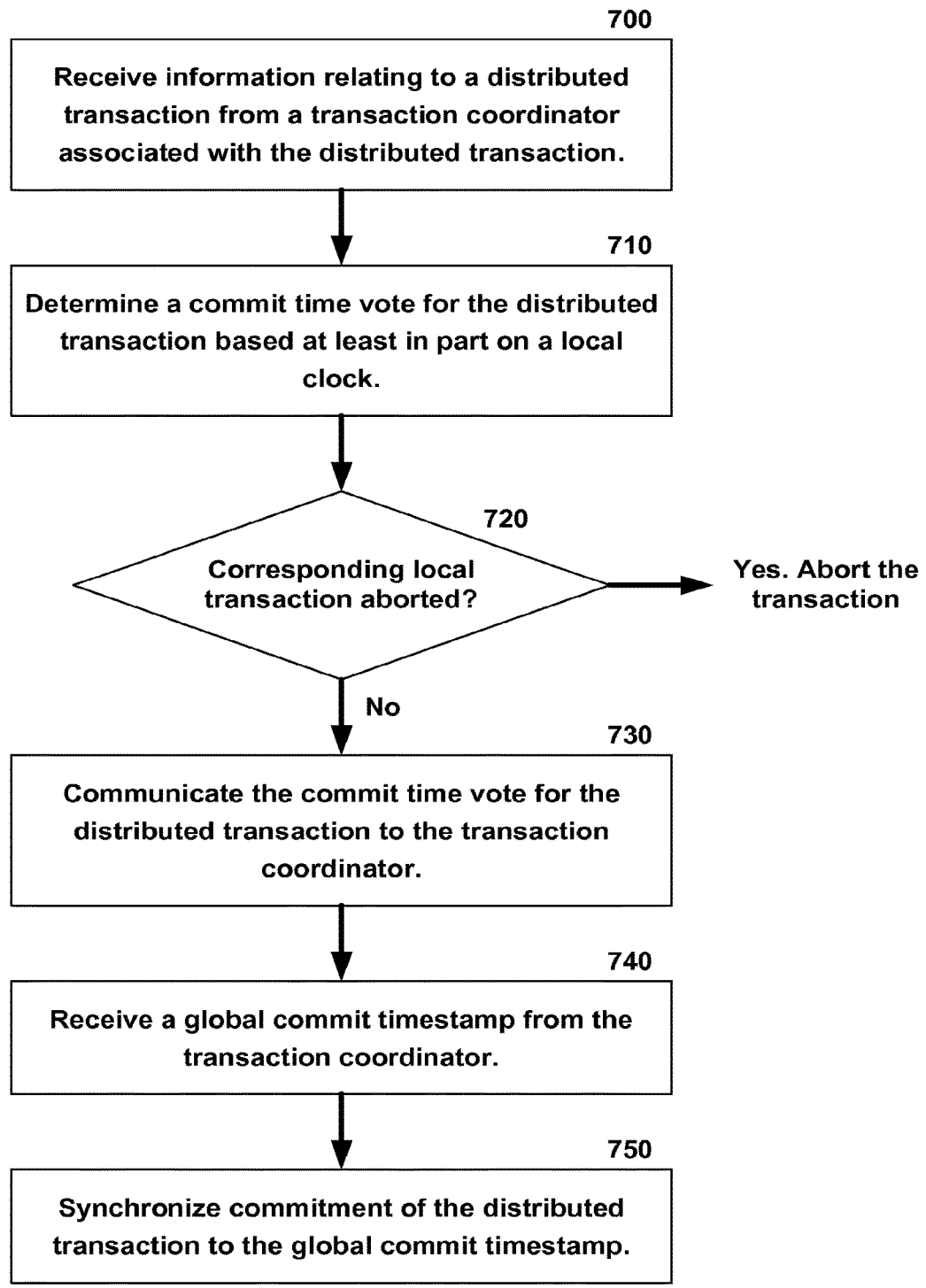
FIG. 7 is still another flow diagram illustrating an exemplary non-limiting process that facilitates coordination and synchronization with a database system in the context of a distributed transaction.

FIG. 7 is a flow diagram illustrating an exemplary non-limiting process for coordination and synchronization with a database system in the context of a distributed transaction. At 700, information relating to a distributed transaction is received from a transaction coordinator associated with the distributed transaction. At 710, a commit time vote for the distributed transaction is determined based at least in part on a local clock. At 720, if a local transaction corresponding to the global transaction has been aborted, the distributed transaction is also aborted. Otherwise, at 730, the commit time vote for the distributed transaction is communicated to the transaction coordinator. At 740, a global commit timestamp is received from the transaction coordinator. At 750, commitment of the distributed transaction is synchronized to the global commit timestamp.

Exemplary Networked and Distributed Environments

One of ordinary skill in the art can appreciate that the various embodiments of the distributed transaction management systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the transaction management mechanisms as described for various embodiments of the subject disclosure.

Figure 8:
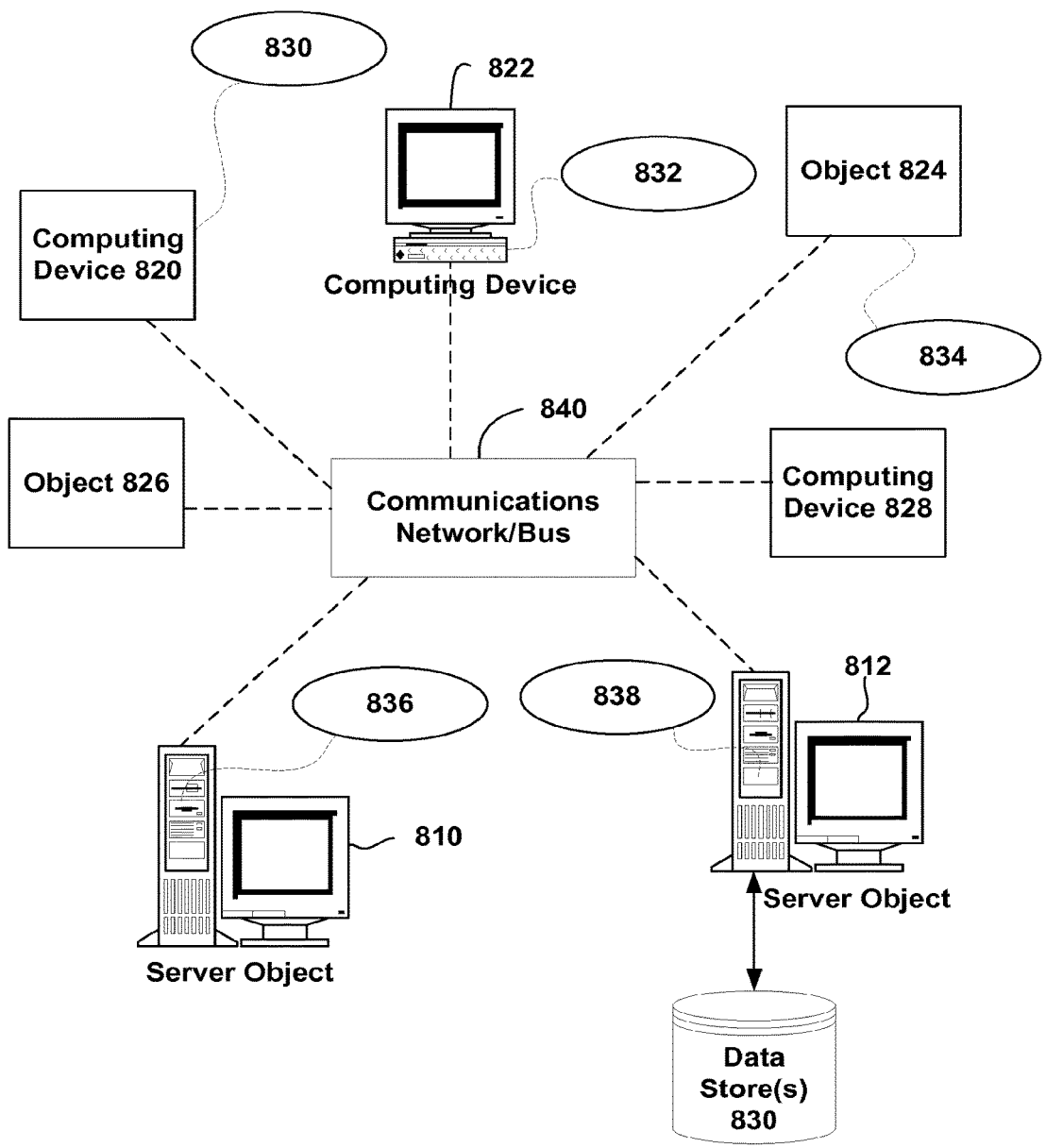
FIG. 8 is a block diagram representing exemplary non-limiting networked environments in which various embodiments described herein can be implemented.

FIG. 8 provides a schematic diagram of an exemplary networked or distributed computing environment. The distributed computing environment comprises computing objects 810, 812, etc. and computing objects or devices 820, 822, 824, 826, 828, etc., which may include programs, methods, data stores, programmable logic, etc., as represented by applications 830, 832, 834, 836, 838. It can be appreciated that computing objects 810, 88, etc. and computing objects or devices 820, 822, 824, 826, 828, etc. may comprise different devices, such as PDAs, audio/video devices, mobile phones, MP3 players, personal computers, laptops, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, communications network 840 may comprise other computing objects and computing devices that provide services to the system of FIG. 8, and/or may represent multiple interconnected networks, which are not shown. Each computing object 810, 812, etc. or computing object or device 820, 822, 824, 826, 828, etc. can also contain an application, such as applications 830, 832, 834, 836, 838, that might make use of an API, or other object, software, firmware and/or hardware, suitable for communication with or implementation of the transaction management provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the serializable snapshot isolation systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc., acting as servers provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances. Any of these computing devices may be processing data, or requesting transaction services or tasks that may implicate the transaction management and multiversioning techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 840 or bus is the Internet, for example, the computing objects 810, 812, etc. can be Web servers with which other computing objects or devices 820, 822, 824, 826, 828, etc. communicate via any of a number of known protocols, such as the hypertext transfer protocol (HTTP). Computing objects 810, 812, etc. acting as servers may also serve as clients, e.g., computing objects or devices 820, 822, 824, 826, 828, etc., as may be characteristic of a distributed computing environment.

Exemplary Computing Device

Figure 9:
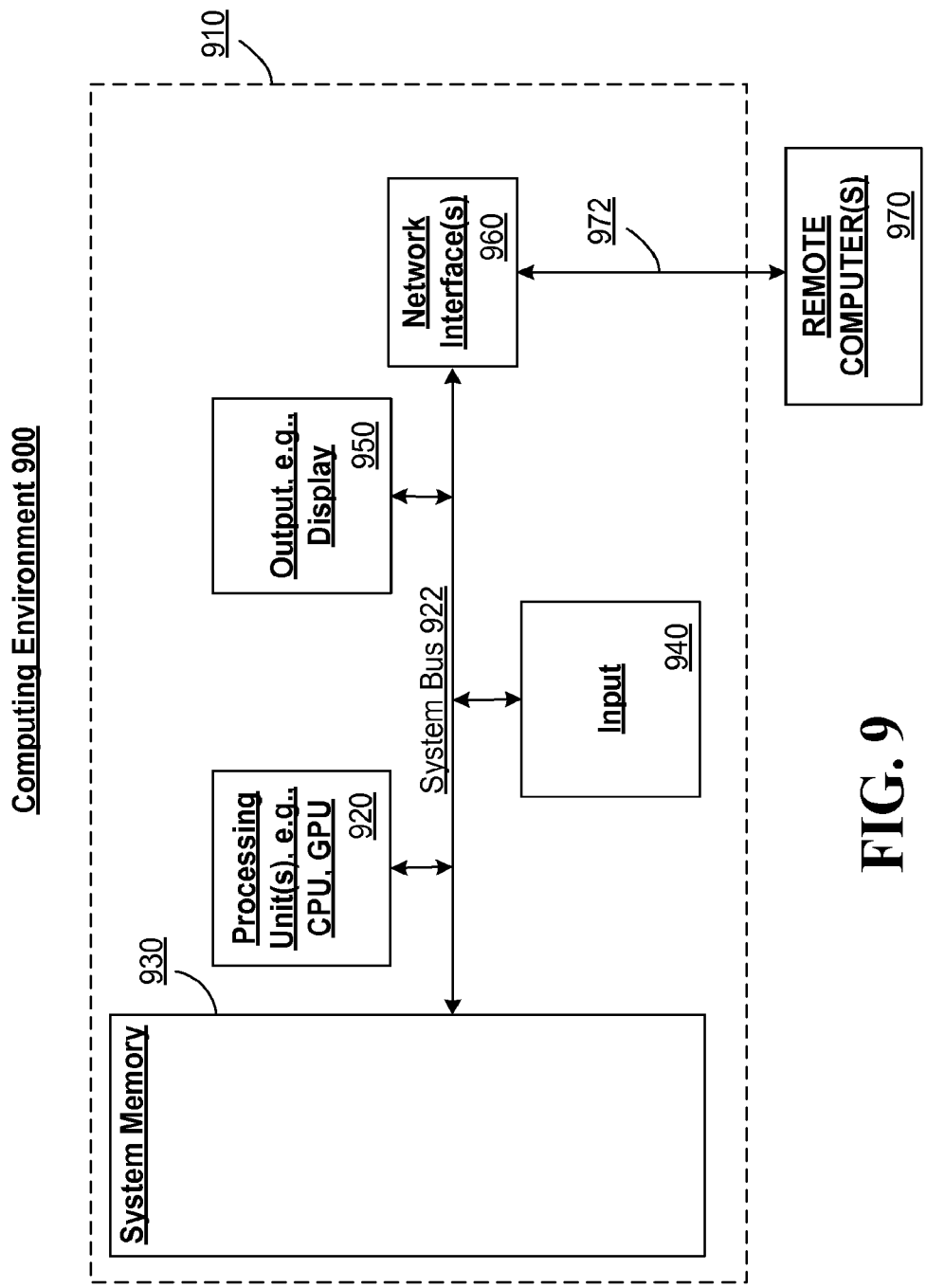
FIG. 9 is a block diagram representing an exemplary non-limiting computing system or operating environment in which one or more aspects of various embodiments described herein can be implemented.

As mentioned, advantageously, the techniques described herein can be applied to any device where it is desirable to perform distributed transaction management. It should be understood, therefore, that handheld, portable and other computing devices and computing objects of all kinds are contemplated for use in connection with the various embodiments, i.e., anywhere that a device may wish to read or write transactions from or to a data store. Accordingly, the below general purpose remote computer described below in FIG. 9 is but one example of a computing device. Additionally, a database server can include one or more aspects of the below general purpose computer, or other database management server components.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. Neither should the computing system environment 900 be interpreted as having any dependency or requirement relating to any one or combination of components illustrated in the exemplary computing system environment 900.

With reference to FIG. 9, an exemplary remote device for implementing one or more embodiments includes a general purpose computing device in the form of a computer 910. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

Also, there are multiple ways to implement the same or similar functionality, e.g., an appropriate API, tool kit, driver code, operating system, control, standalone or downloadable software object, etc. which enables applications and services to take advantage of techniques provided herein. Thus, embodiments herein are contemplated from the standpoint of an API (or other software object), as well as from a software or hardware object that implements one or more aspects of the concurrency control including validation tests described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A system that processes a transaction on behalf of a node set, the system comprising:
    a processing unit; and
    a memory storing instructions that, when executed by the processing unit, cause the distributed system to:
        initiate a transaction involving data locally stored by a plurality of nodes of the node set,
        send a transaction request to respective participating nodes of the node set to participate in the transaction,
        receive, from the respective participating nodes, a commit time vote for the transaction according to a local clock maintained by the participating node,
        based on the commit time votes of the respective participating nodes, determine a commit time for the transaction having a maximum count of votes among the plurality of participating nodes, and
        initiate commit processing of the transaction by sending a commit request to the participating nodes of the node set, wherein the commit request includes the commit time for the transaction, wherein the notification enables the respective participating nodes that did not vote for the commit time selected for the transaction to advance the local clock to synchronize with the participating nodes that voted for the commit time.

2. The system according to claim 1, further comprising the individual participating node and the another individual participating node.

3. The system according to claim 2, wherein the first instructions cause the first node to provide a logical read time to the multiple other participating nodes and the multiple other participating nodes use the logical read time to implement the transaction.

4. The system according to claim 3, wherein the commit request identifies certain participating nodes as read-only nodes in the transaction and further participating nodes as writing nodes that write to implement the transaction.

5. The system according to claim 4, wherein the second instructions cause the second node to: perform multiple phases of communications with the writing nodes to commit the transaction; and perform only a single phase of communication with the read-only nodes to commit the transaction.

6. The system according to claim 5, wherein the multiple phases of communications performed with the writing nodes comprise a prepare phase, a voting phase, and a commit/abort phase.

7. The system of claim 6, wherein the single phase of communication performed with the read-only nodes comprises the prepare phase.

8. The method of claim 1, wherein selecting the commit time having a maximum count of votes among the plurality of participating nodes reduces the number of participating nodes that have to advance a local clock to synchronize with the other participating nodes of the node set.

9. A node of a node set that participates in a distributed transaction, the node comprising:
    a processing unit; and
    a memory storing instructions which, when executed by the processing unit, cause the processing unit to:
    maintain a local clock;
    collect commit time votes for the transaction from a plurality of participating nodes of the node set, wherein the participating nodes participate in the transaction by accessing local data involved in the transaction, and wherein the commit time votes reflect local clock values of the local clocks maintained by other participating nodes of the node set;
    based on the local clock and the commit time votes, determine a commit time for the transaction having a maximum count of votes among the plurality of participating nodes; and
    notify the plurality of other participating nodes of the commit time for the transaction, wherein the notification enables the respective participating nodes that did not vote for the commit time selected for the transaction to advance the local clock to synchronize with the participating nodes that voted for the commit time.

10. The node according to claim 9, wherein the commit time votes are received directly from the plurality of participating nodes.

11. The node according to claim 9, wherein the distributed system comprises other nodes that do not participate in the transaction.

12. The node according to claim 9, wherein the instructions cause the processing unit to: coordinate a plurality of transactions in the distributed system that occur on different nodes of the distributed system.

13. The node according to claim 12, wherein the instructions cause the processing unit to: coordinate the plurality of transactions by broadcasting messages to the different nodes of the distributed system, the messages including precommit, prepare, and commit/abort requests for multiple different transactions.

14. The node according to claim 13, wherein the instructions cause the processing unit to: broadcast the messages at regular intervals.

15. The node of claim 9, wherein determining the commit time for the transaction further comprises: determining, as the commit time, a selected time plus a time delta value representing a duration in which local transaction activity performed by the node is to be completed.

16. The node of claim 9, wherein determining the commit time for the transaction further comprises: determining, as the commit time, a latest commit time among the commit time votes received from the plurality of participating nodes.

17. The node of claim 9, wherein determining the commit time for the transaction further comprises: responsive to determining that the commit time is earlier than a local clock of a participating node:
refraining from completing commitment of the transaction; and
initiating, among the participating nodes of the node set, a transaction retry request for the transaction.

18. A method of processing a transaction on behalf of a node set on a distributed transaction processor having a processing unit, the method comprising:
executing, by the processing unit, instructions that cause the distributed transaction processor to:
maintain a local clock at the distributed transaction processor;
collect commit time votes for the transaction from a plurality of participating nodes of the node set, wherein the participating nodes participate in the transaction by accessing local data involved in the transaction, and wherein the commit time votes reflect local clock values of other local clocks maintained by the respective participating nodes;
based on the commit time votes, determine a commit time for the transaction having a maximum count of votes among the plurality of participating nodes; and
notify the plurality of participating nodes of the commit time for the transaction, wherein the notification enables the respective participating nodes that did not vote for the commit time selected for the transaction to advance the local clock to synchronize with the participating nodes that voted for the commit time.

19. The method of claim 18, wherein the local clock comprises a monotonically increasing counter.

20. The method of claim 18, wherein executing the instructions further causes the distributed transaction coordinator to:
send a value of the local clock to a transaction coordinator that coordinates a transaction involving the node and multiple other nodes;
receive a different clock value from the transaction coordinator; and
advance the local clock based on the different clock value received from the transaction coordinator.

21. The method of claim 18, wherein executing the instructions further causes the distributed transaction coordinator to:
receive a start time of a particular transaction; and
responsive to receipt of the start time of the particular transaction, perform garbage collection for other transactions that precede the start time but not further transactions that do not precede the start time.

22. The method of claim 21, wherein the transaction further comprises an oldest active transaction in a transaction set handled by the node set.

23. The method of claim 18, wherein notifying the respective participating nodes of the transaction commit time further comprises: requesting the respective participating nodes to advance the local clock of the participating node according to the commit time.

* * * * *